Nov. 13, 1928.

B. G. LA BAR 1,691,354

ELECTRICAL MEASURING INSTRUMENT

Filed Sept. 8, 1924

WITNESSES:
C. J. Weller,
E R Evans

INVENTOR
Bert G. LaBar
BY
Wesley G. Barr
ATTORNEY

Patented Nov. 13, 1928.

1,691,354

UNITED STATES PATENT OFFICE.

BERT G. LA BAR, OF TURTLE CREEK, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed September 8, 1924. Serial No. 736,425.

My invention relates to electrical measuring instruments and particularly to induction watthour meters.

An object of my invention is to provide an instrument of this character with improved means for compensating for the friction of the rotating elements.

Referring to the accompanying drawings in which I have shown a preferred embodiment of the invention, Figure 1 is a plan view of a portion of an induction watthour meter embodying my invention;

Figure 1:
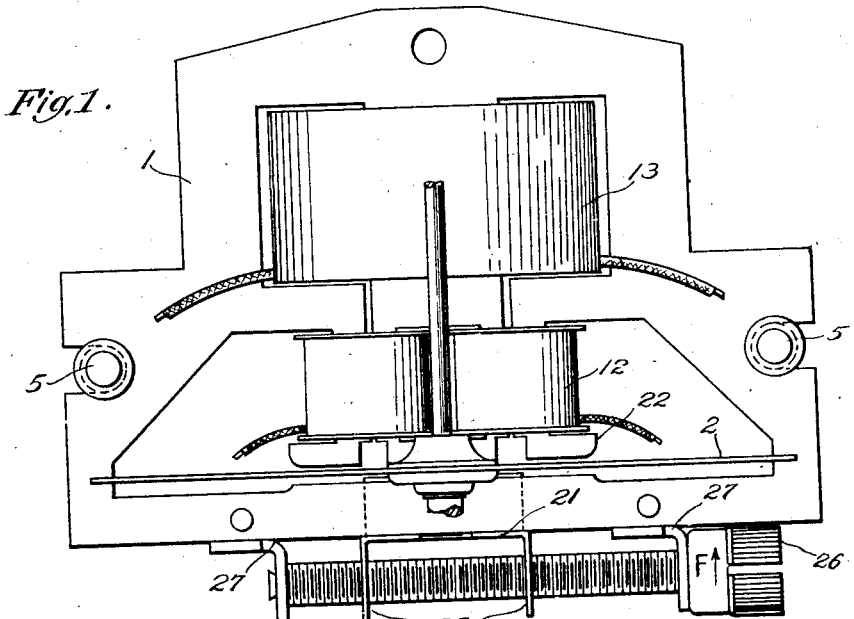

The induction watthour meter shown in the drawings comprises a magnetizable core member 1, a rotatable disc armature 2 cooperating with said core member, permanent magnets (not shown) adjacent to the disc 2 to effect a counter-torque thereon and a register (not shown) for recording the number of revolutions of the armature 2. The meter elements enumerated are secured by two studs 5 to a base 6.

The core member 1 is energized in the usual manner by series and shunt windings 12 and 13. It will be understood that the meter is energized in accordance with the transmission of energy in an associated circuit whereby the disc 2 rotates approximately in proportion to the load consumed in said circuit. The number of revolutions of the disc 2 is recorded upon the register (not shown) and, therefore, an indication of the total energy consumption is provided by said register.

Figure 2:
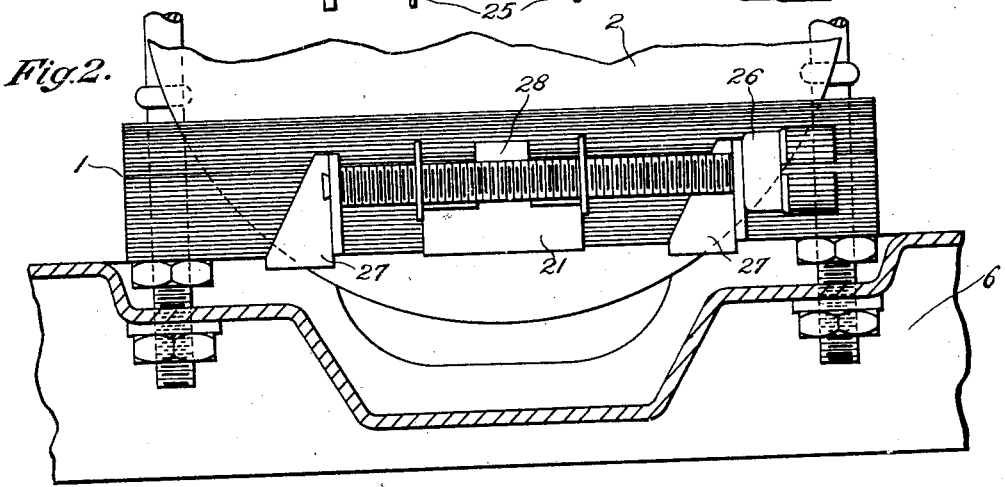
Fig. 2 is a bottom plan view of the device shown in Fig. 1.
Figure 3:
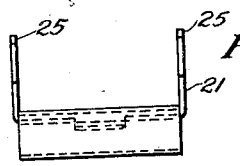
Figs. 3 to 5 are views of the light-load or friction-compensating element.
Figure 5:
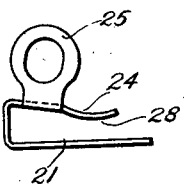
Figure 4:
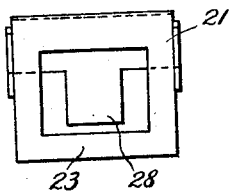

Referring to Figs. 1 and 2, the rotation of the armature 2 is caused by the torque produced by the resultant magnetic flux in the core member 1 produced by the energization of the series and shunt windings 12 and 13. At light loads, the shunt coil 13 is fully energized, but the series coils 12 are substantially deenergized. In order to compensate for the friction of the rotating armature 2 and of the register 4, I have provided means cooperating with the constantly-energized shunt coil 13 to produce a slight torque on the armature 2 that is sufficient to balance the frictional torque. A member 21, of electrically conducting material shown in detail in Figs. 3 to 5, is mounted on the core member 1 opposite the poles 22 thereof. As shown, the compensating member comprises a portion 23 that is adapted to be positioned in the air gap adjacent to the poles 22 and the armature 2, and a clamping portion 24 having resilient projecting lugs 25. An adjusting screw 26 mounted on the core member 1 engages the lugs 25. The adjusting screw 26 is so mounted upon brackets 27 that it will rotate freely therein. Upon turning the adjusting screw, the position of the compensating member 21 is shifted transversely along the air gap adjacent to the pole pieces 22 thereby permitting accurate conpensation for the friction of the rotating element. The compensating member 21 is preferably made of brass or other similar non-magnetic metal and is provided with a central projection 28 that is adapted to clamp over the laminations of the core member 1 and prevent any play between the core member and the compensating element. On account of the resilient character of the lugs 25, there is a binding action on the threads of the adjusting screw 26 which prevents any relative motion or vibration of the compensating member 21.

I am aware that many changes may be made in practicing my invention without departing from the spirit thereof and therefore, I do not wish it to be limited in scope except as may be indicated in the appended claims.

I claim as my invention:

1. An electrical measuring instrument comprising a magnetizable core member, means for energizing said core member, a pivoted armature adjacent said core member, and friction-compensating means for said armature, said compensating means comprising a reciprocally movable conducting member resiliently engaging said core member.

2. An electrical measuring instrument comprising a magnetizable core member, means for energizing said core member, a pivoted armature adjacent said core member, and friction-compensating means for said armature, said compensating means comprising a reciprocaally movable conducting member resiliently engaging said core member, said conducting member having aligned lugs and an adjusting screw engaging said lugs.

In testimony whereof, I have hereunto subscribed my name this 4th day of September, 1924.

BERT G. LA BAR.